United States Patent
Gammons (10) Patent No.: US 7,828,336 B2
(45) Date of Patent: Nov. 9, 2010

(54) QUICK DISCONNECT SAFETY CONNECTOR

(75) Inventor: Clifford Eugene Gammons, Loudon, TN (US)

(73) Assignee: Adroit Development, Inc., Loudon, TN (US)

( * ) Notice: Subject to any disclaimer, the term of this patent is extended or adjusted under 35 U.S.C. 154(b) by 670 days.

(21) Appl. No.: 11/298,399

(22) Filed: Dec. 9, 2005

(65) Prior Publication Data

US 2006/0128180 A1  Jun. 15, 2006

Related U.S. Application Data

(60) Provisional application No. 60/634,805, filed on Dec. 9, 2004.

(51) Int. Cl.
*F16L 37/086* (2006.01)

(52) U.S. Cl. .................. 285/317; 285/307; 285/308

(58) Field of Classification Search ................ 285/308, 285/317, 1, 306, 307
See application file for complete search history.

(56) References Cited

U.S. PATENT DOCUMENTS

| | | | |
|---|---|---|---|
| 707,991 A * | 8/1902 | Wareham | 285/280 |
| 2,898,130 A * | 8/1959 | Hansen | 285/277 |
| 3,538,940 A | 11/1970 | Graham | |
| 4,116,476 A | 9/1978 | Porter et al. | |
| 4,436,125 A | 3/1984 | Blenkush | |
| 4,541,457 A * | 9/1985 | Blenkush | 137/614.06 |
| 4,753,268 A | 6/1988 | Palau | |
| 4,863,201 A * | 9/1989 | Carstens | 285/317 |
| 5,033,777 A * | 7/1991 | Blenkush | 285/317 |
| 5,052,725 A | 10/1991 | Meyer et al. | |
| 5,104,158 A | 4/1992 | Meyer et al. | |
| 5,316,041 A * | 5/1994 | Ramacier et al. | 137/614.04 |
| 5,494,074 A * | 2/1996 | Ramacier et al. | 137/614.04 |
| 5,845,943 A * | 12/1998 | Ramacier et al. | 285/12 |
| 5,941,577 A * | 8/1999 | Musellec | 285/317 |
| 5,975,489 A * | 11/1999 | deCler et al. | 251/149.1 |
| 6,231,089 B1 * | 5/2001 | DeCler et al. | 285/308 |
| 2004/0021316 A1 * | 2/2004 | Rogg | 285/308 |
| 2005/0012330 A1 * | 1/2005 | Schmidt | 285/317 |
| 2005/0057042 A1 * | 3/2005 | Wicks | 285/305 |
| 2008/0061553 A1 * | 3/2008 | Schmidt | 285/317 |

\* cited by examiner

*Primary Examiner*—James M Hewitt
(74) *Attorney, Agent, or Firm*—Knox Patents; Thomas A. Kulaga (57) ABSTRACT

An apparatus for connecting two hoses with a quick disconnect feature. A male plug is insertable into a female receiver and latched into position with a latch operator. The male plug is disconnected from the receiver by operating the latch operator or by pulling the male plug out of the receiver.

20 Claims, 5 Drawing Sheets

QUICK DISCONNECT SAFETY CONNECTOR

CROSS-REFERENCE TO RELATED APPLICATIONS

This application claims the benefit of U.S. Provisional Application No. 60/634,805, filed Dec. 9, 2004.

STATEMENT REGARDING FEDERALLY SPONSORED RESEARCH OR DEVELOPMENT

Not Applicable

BACKGROUND OF THE INVENTION

1. Field of Invention

This invention pertains to a quick-disconnect safety connector for connecting two hoses. More particularly, this invention pertains to a safety connector including a male plug configured to be retained within a female receiver to establish fluid communication between the two hoses, and which is releasable from engagement upon application of opposing forces on the male plug and female receiver.

2. Description of the Related Art

It is well known in the art of hose connectors to provide various configurations of such connectors to establish fluid communication between selected devices. Typically, a positively-locked connection is made in order to prevent unselected disengagement of the devices in such communication. Release mechanisms of various configurations are provided for unlocking the connection between the components of the connectors. Typically, release mechanisms require active engagement of the mechanism prior to disengagement of the two devices.

While conventional release mechanisms provide positive locking mechanisms for securing two devices in fluid communication, they can also be cumbersome to disengage. In certain situations it is necessary to quickly disconnect devices while the operator may not have the ability to manipulate the release mechanism, grasp both hoses connecting the devices, and pull the two devices apart.

BRIEF SUMMARY OF THE INVENTION

A quick-disconnect safety connector for connecting two devices in fluid communication is provided. The connector includes a male adapter and a female adapter configured to receive the male adapter. The female adapter includes a locking mechanism for engaging the male adapter in order to establish fluid communication through the connector.

The male adapter defines a groove configured to receive the locking mechanism. An O-ring is carried by the male adaptor at its largest diameter in order to seal the connection between the male plug and the female receiver.

The female adapter defines an opening for receiving a latch operator. The latch operator defines a handle which extends above the receiver body. Between the handle and the receiver body is a spring, which fits into a spring cup formed in the handle. The latch operator further includes a tang adapted to be received within the latch body opening. The tang defines an opening configured to receive the outboard section of the plug. The tang further defines a lower border of the opening being dimensioned for engaging the groove for the purpose of interlocking the female adapter and the plug attached to the male adapter. Additionally, the tang defines a first side inboard to the first hose secured to the female adapter, and a first chamfer on the first side along the lower border of the opening. A corner defines the boundary between the first side of the tang and the first chamfer.

The tang defines a second chamfer on the second side along the lower border of the opening. An apex is defined by the interface between the first chamfer and the second chamfer along the lower border of the opening. When the plug of the male adapter is inserted into the female adapter, the plug nose engages the second chamfer and forces the handle toward the receiver body by compressing the spring.

In normal use, contact is made between the apex of the lower border of the opening defined by the tang and the lower surface of the groove. This contact is maintained by the upward force of the biased latch operator. The first chamfer is defined such that, in the event of contact with the male adapter groove, the corner of the first shoulder is contacting only the first chamfer. Neither the first side of the tang nor any corner that may define the boundary between the first side of the tang and the first chamfer is contacting the corner of the first shoulder. Upon application of a sufficient pulling force on the hoses, the male adapter and female adapter are disengaged.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A quick disconnect safety connector for connecting two devices in fluid communication is disclosed. The safety connector of the present invention is provided for connecting two devices in fluid communication in such a manner as to allow a positive connection between a male plug and a female receptor. The components of the connector are disconnected by manipulating a locking mechanism and pulling the components apart. However, the male plug and female receptor are configured to also be releasable one from the other upon the application of a sufficient force along the longitudinal axis of the connector and without manipulating the locking mechanism.

Figure 1:
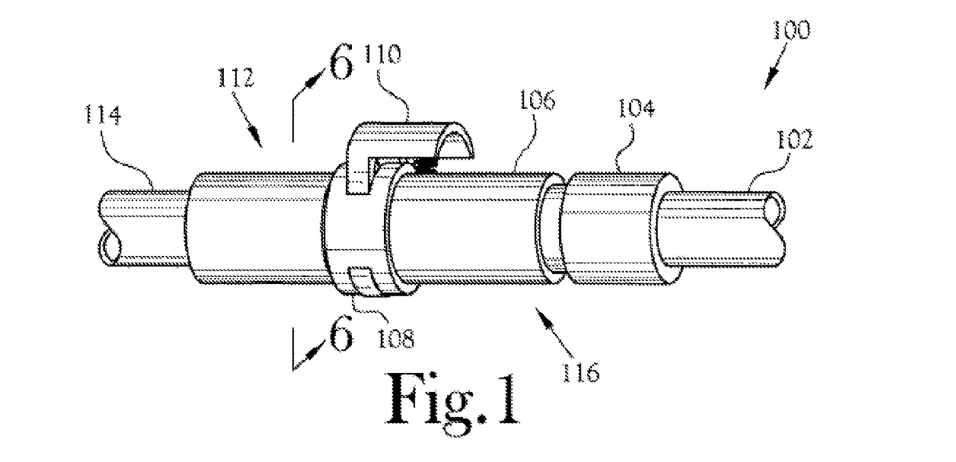
FIG. 1 is a perspective view of one embodiment of a quick disconnect safety connector constructed in accordance with several features of the present invention.

FIG. 1 illustrates a perspective view of one embodiment of the connector 100. The connector 100 includes the male adapter 112 and the female adapter 116. The female adapter 116 attaches to the first hose 102 via the first hose clamp 104. The male adapter 112 likewise attaches to the second hose 114. The female adapter 116 has a receiver body 106 attached to a latch body 108. The latch body 108 carries a latch operator 110 which defines the locking mechanism.

Figure 2:
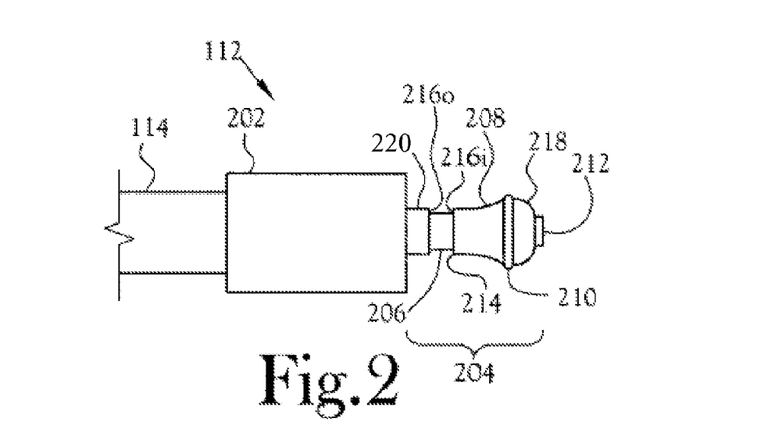
FIG. 2 is a side elevation view of one embodiment of a male plug included in the connector illustrated in FIG. 1.

FIG. 2 illustrates a side view of one embodiment of the male adapter 112. The male adapter 112 attaches to the second hose 114 via the second hose clamp 202. Adjacent the hose clamp 202 is a plug 204 that has a groove 206 defining the outboard section 208 of the plug 204 and the inboard section 220 of the plug 204. In the illustrated embodiment, the groove 206 defines side walls 216i, 216o. In this embodiment, the groove 206 defines a lower corner 214 of the outboard section 208 of the plug 204.

In the illustrated embodiment, the outboard section of the plug 204 defines a substantially bulb-shaped configuration from the groove 206 and toward the plug nose 212, which is configured to be received by the female receiver 116. The plug 204 defines a convex surface 218 adjacent to plug nose 212. The outboard section of the plug 204 defines a groove along its maximum diameter to receive an O-ring 210. The O-ring 210 serves to seal the connection between the plug 204 and the female receiver 116 to establish sealed fluid communication. In another embodiment, the outboard section of the plug 204 has a cylindrical shape.

The first hose 102, which is attached to the female adapter 116, is secured by the first hose clamp 104. Similarly, the second hose 114, which is attached to the male adapter 112, is secured by the second hose clamp 202. Those skilled in the art will recognize that the hose clamps 104, 202 can be of various types without departing from the spirit and scope of the present invention.

Figure 3:
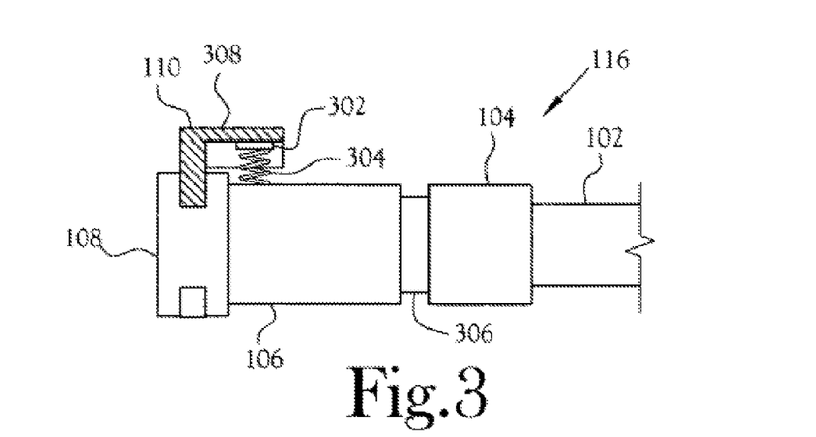
FIG. 3 is a side elevation view of one embodiment of a female receiver included in the connector illustrated in FIG. 1.

FIG. 3 illustrates a side view of one embodiment of the female adapter 116. In this view, a latch operator 110 is received in the latch body 108. The latch operator 110 defines a handle 308, which extends above the receiver body 106. Between the handle 308 and the receiver body 106 is a spring 304, which fits into a spring cup 302 formed in the handle 308.

Figure 4:
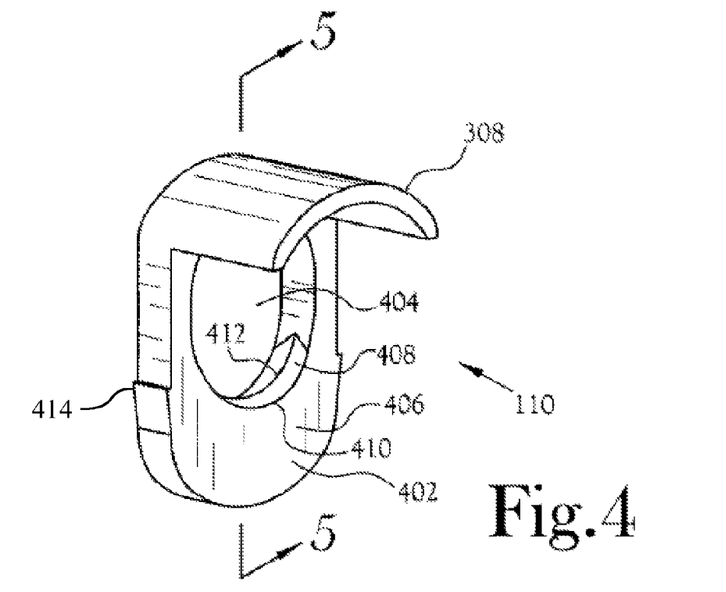
FIG. 4 is a perspective view of one embodiment of a latch operator carried by the female receiver illustrated in FIG. 3.

FIG. 4 illustrates a perspective view of one embodiment of the latch operator 110. The latch operator 110 includes the handle 308 and a tang 402, which extends into the latch body 108. The tang 402 defines an opening 404 configured to receive the outboard section of the plug 208. The opening 404 defines a substantially oval configuration. The tang 402 further defines a lower border 412 of the opening 404 being dimensioned for engaging the groove 206 for the purpose of interlocking the female adapter 116 and the plug 204 attached to the male adapter 112. Additionally, the tang 402 defines a first side 406 inboard to the first hose 102 secured to the female adapter 116, and a first chamfer 408 on the first side 406 along the lower border 412 of the opening 408. A corner 410 defines the boundary between the first side 406 of the tang 402 and the first chamfer 408.

In one embodiment, the latch operator 110 is fabricated of a hard plastic that is capable of withstanding repeated interactions with the groove 206 without wearing appreciably. In still another embodiment, the latch operator 110 includes a lubricant that aids in the interaction with the groove 206. In one embodiment, the lubricant is embedded in, or integral to, the material of the latch operator 110.

Figure 5:
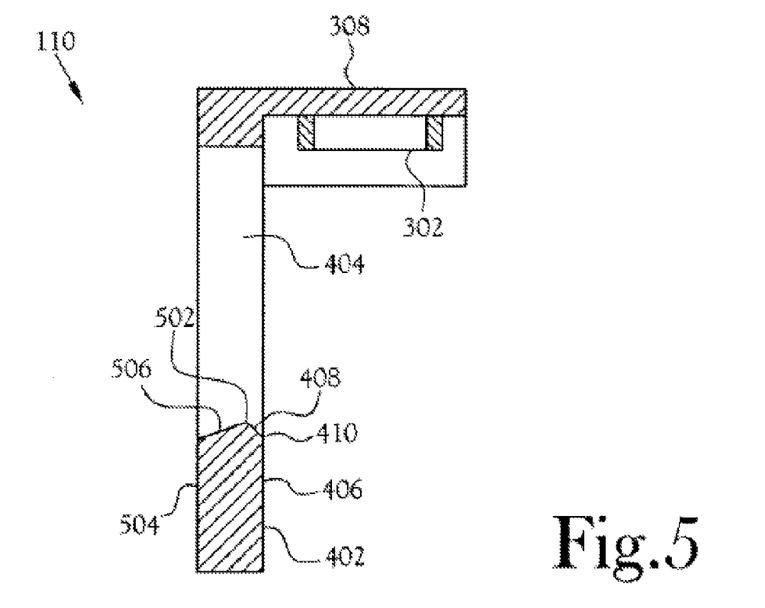
FIG. 5 is a side elevation view, in section, of the latch operator, taken along lines 5-5 of FIG. 4.

FIG. 5 illustrates a cross-sectional view of the latch operator 110 showing the opening 404 and the spring cup 302. In the illustrated embodiment, the spring cup 302 is adapted to receive the end of the spring 304. FIG. 5 also shows the tang 402, which defines the second side 504 outboard to the first hose 102 secured to the female adapter 116. The tang 402 defines the second chamfer 506 on the second side 504 along the lower border of the opening 404. An apex 502 is defined by the interface between the first chamfer 408 and the second chamfer 506 along the lower border 412 of the opening 404. When the plug 204 of the male adapter 112 is inserted into the female adapter 116, the plug nose 212 engages the second chamfer 506 and forces the handle 308 toward the receiver body 106 by compressing the spring 304. In one method, the handle 308 is pressed against the receiver body 106 by the human operator, thereby reducing the engagement of the second chamfer 506 with the groove 206 of the plug 112. In another embodiment, force of the plug 204 against the second chamfer 506 moves the latch operator 110 without any force applied on the handle 308.

Figure 6:
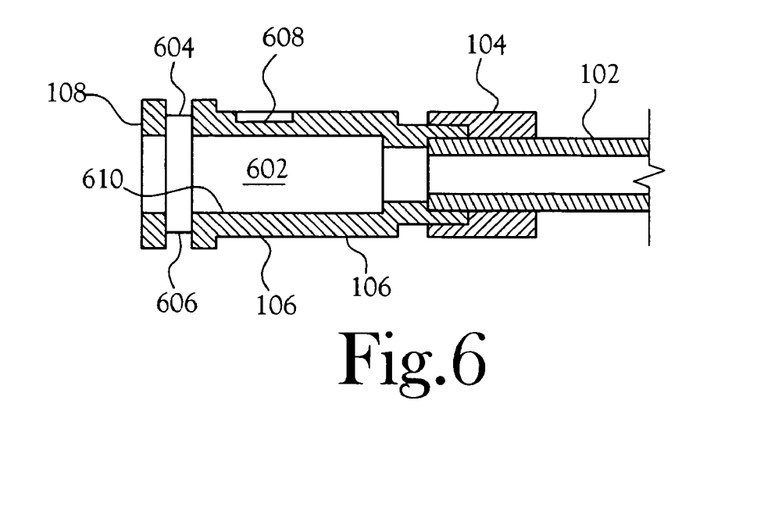
FIG. 6 is a side elevation view, in section, of the female receiver, taken along lines 6-6 of FIG. 1.

FIG. 6 illustrates a cross-sectional view of the female adapter 116. Inside the female adapter 116 is a cavity 602 for receiving the outboard section 208 of the plug 204, including the plug nose 212 and O-ring 210. The O-ring 210 engages the inside surface of the cavity 602, thereby forming a seal between the plug 204 of the male adapter 112 and the female adapter 116. The cavity further defines the lower surface of the cavity 610, which assumes greater relevance later in this specification. The latch body 108 has a slot 604 into which the tang 402 is inserted until it extends down to the lower end 606 of the slot. In one embodiment, the tang 402 has opposing protuberances 412 that pass through the slot 604 and the lower end 606 such that the tang 402 is held captive in the latch body 108.

The receiver body 106 has a recess, or spring cup, 608 that receives the end of the spring 304 opposite the end that engages latch handle 308. The two spring cups 302, 608 secure the spring 304 such that is held captive to the receiver 116. In one embodiment, the spring 304 has a conical shape, that is, one end of the spring 304 has a smaller diameter than the opposite end of the spring 304. In one embodiment with the conical spring 304, the end with the smaller diameter contacts the receiver body 106 and, therefore, the spring cup 608 on the receiver body 106 is dimensionally smaller than the spring cup 302 associated with the latch handle 308.

Figure 7:
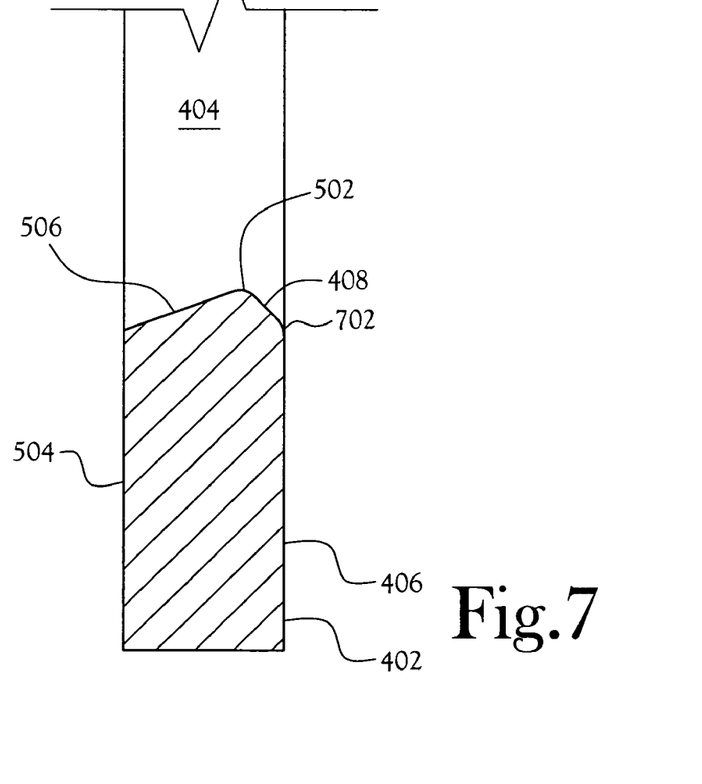
FIG. 7 is an enlarged cross-sectional view of a portion of the latch operator, taken along lines 5-5 of FIG. 4.

FIG. 7 illustrates a close-up cross-sectional view of the latch operator 110 showing the details of the first chamfer 408 and the second chamfer 506. In the illustrated embodiment, the first chamfer 408 forms an angle relative to the first side 406 of the tang 402 that is greater than the angle formed by second chamfer 506 relative to the second side 504 of the tang 402. In one embodiment, the angle of the first chamfer 408 is 70° relative to the first side 406 of the tang 402, and the angle of the second chamfer 506 is 60° relative to the second side 504 of the tang 402. In the illustrated embodiment, there is a rounded interface 702 between the first chamfer 408 and the first side 406 of the tang 402. The rounded interface 702 provides a surface for contact with the lower corner 214 of the outboard section 208 of the plug 204, enabling the male adapter 112 to slide as it is pulled out of the female adapter 116. However, it will be understood that the present invention is not limited to the various configurations and angles represented herein, but such are exemplary only.

When making a connection between the male adapter 112 and the female adapter 116, as the plug nose 212, O-ring 210, and the remainder of the outboard section 208 of the plug 204 pass through the opening 404, the lower border 412 of the opening 404, including the second chamfer 506, engages the groove 206, at which time the spring 304 forces the handle 308 away from the receiver body 106 and causes the lower end of the tang 402, which is distal to the latch handle 308, to enter the groove 206, thereby latching, or locking, the plug 204 of the male adapter 112 in the female adapter 116. Alternatively, the latch handle 308 is pressed toward the receiver body 106, thereby disposing the opening 404 such that the outboard section 208 of the plug 204 passes freely through the opening 404.

Pressure applied to a fluid in the hoses 102, 114 tends to apply force to separate the male adapter 112 from the female adapter 116. This force causes the first chamfer 408 of the tang 402 to engage the lower corner 214 of the outboard section 208 of the plug 204. The configuration of the first chamfer 408 is such that the latch tang 402 remains stationary when operating pressure is applied to the fluid in the hoses 102, 114. When the tensile force applied between the male adapter 112 and the female adapter 116 exceeds a set value, the lower corner 214 of the outboard section 208 of the plug 204 engages the first chamfer 408 and forces the tang 402 to move laterally against the spring 304 pressure, thereby allowing the male adapter 112 to separate from the female adapter 116.

The connector 100 is suitable for use where the connector 100 must be separated without recourse to operating the latch 110, such as might happen when the connector 100 needs to be separated during an emergency. In such a case, the inside chamfer 408 with rounded interface 702, in combination with the groove 206 and the spring 304, allows the male adapter 112 to be pulled out of the female adapter 116 with little force. The inside chamfer 408 is configured such that the latch holds under operating pressure, yet gives way when the connector 100 is pulled apart. Further, the spring 304 is of such a length, width, and strength that the force to disconnect is controlled.

Figure 8A:
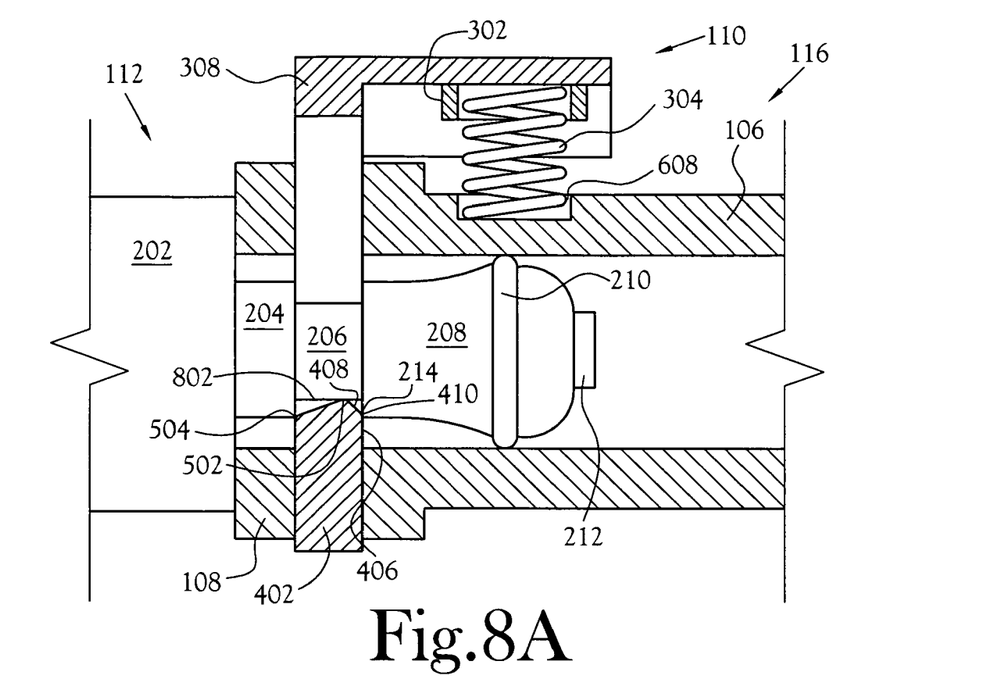
FIG. 8A is a partial cross-sectional view of the connector of FIG. 1, showing the male adaptor engaged within the female adapter.
Figure 8B:
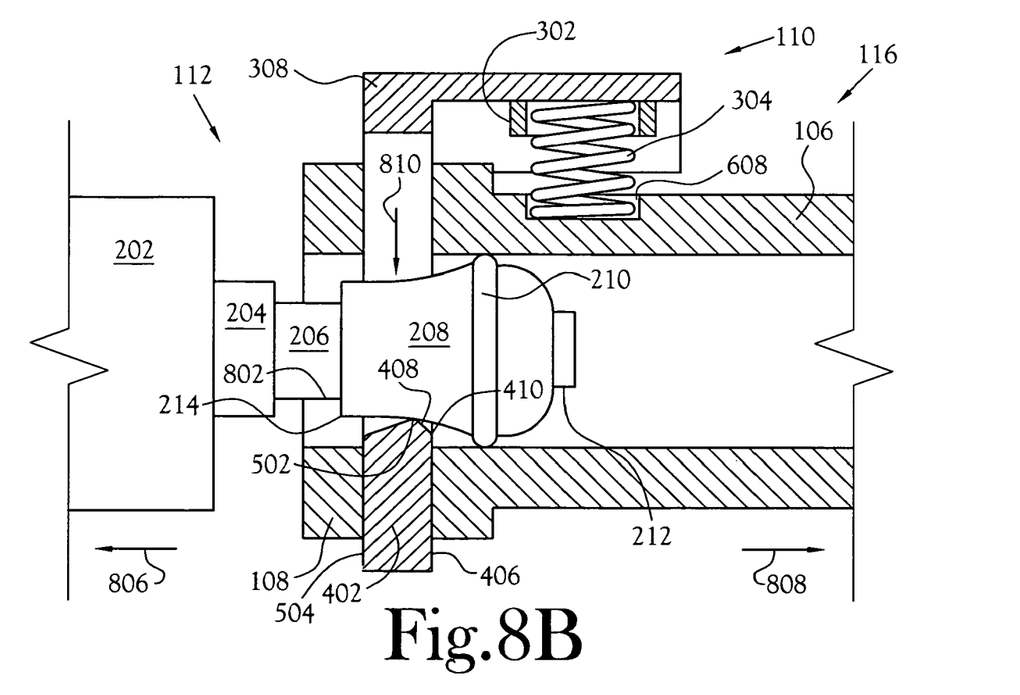
FIG. 8B is a partial cross-sectional view of the connector of FIG. 1, showing the male adapter being removed from the female adapter.
Figure 8C:
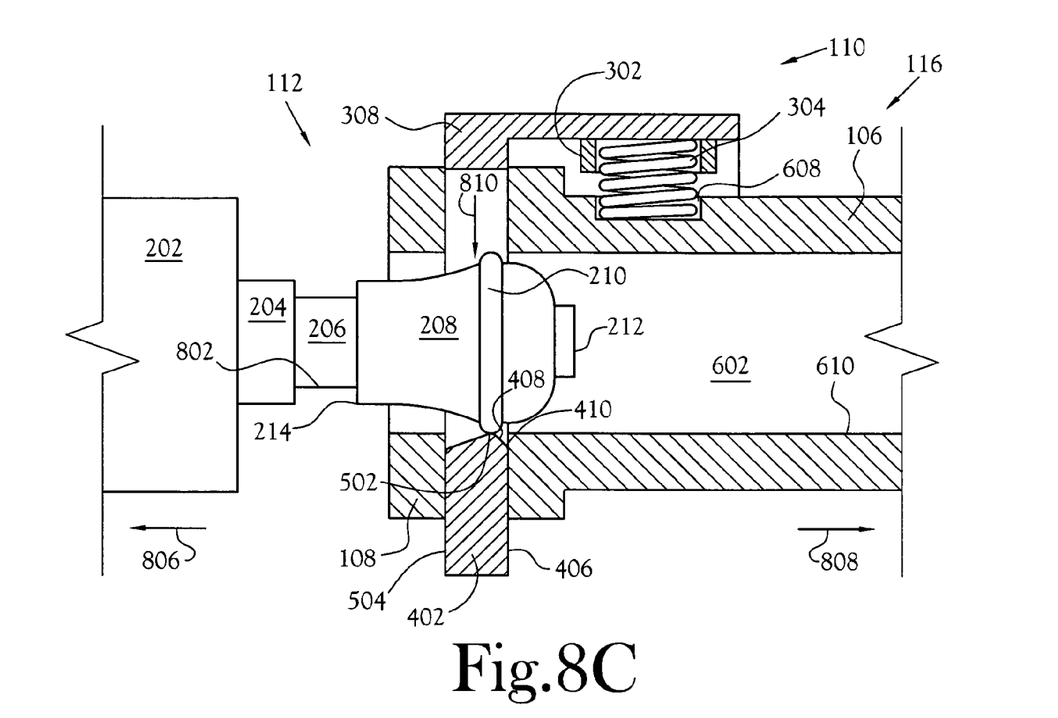
FIG. 8C is a partial cross-sectional view of the connector of FIG. 1, showing the male adapter being removed further from the female adapter.

FIGS. 8A, 8B and 8C further reveal the functioning of the connector. FIG. 8A shows the male adapter 112 fully secured in the female adapter 116. There is contact between the apex 502 of the lower border 412 of the opening 404 defined by the tang 402 and the lower surface 802 of the groove 206. This contact is maintained by the upward force of the biased latch operator 110. During this stage, contact may occur between the first chamfer 408 and the corner of the first shoulder 214. The first chamfer 408 is defined such that, in the event of such contact, the corner of the first shoulder 214 engages a minimal amount of the tang first side 406 in order to withstand normal operating pressures within the connector 100 without the male adapter 112 becoming disengaged from within the female adapter 116.

Upon application of a sufficient pulling force on the hoses 102, 114, the male adapter 112 and female adapter 116 are disengaged. As illustrated in FIG. 8B, the apex 502 of the lower border 412 of the opening 404 defined by the tang 402 no longer is contacting the lower surface 802 of the groove 206. The pulling forces 806, 808, in promoting the withdrawal of the male adapter 112 from the female adapter 116, cause the corner of the first shoulder 214 to engage and operate against the first chamfer 408, forcing the biased latch operator 110 downward, thereby allowing the corner of the first shoulder 214 to clear the apex 502. At this stage, the contour of the outboard section 208 of the plug 204 continues to translate the pulling force into a downward force 810 that opposes the biased latch operator 110 and forces the biased latch operator 110 downward, thereby facilitating the withdrawal of the male adapter 112.

As illustrated in FIG. 8C, as the pulling forces continue as illustrated by arrows 806, 808, the male adapter 112 continues to be withdrawn until the apex 502 of the lower border 412 of the opening 404 disengages from the male adapter 112 and the hoses 102 and 114 are disconnected. The O-ring 210 of the male adapter 204, which defines the section of the plug 204 having the greatest diameter, is illustrated as engaging the apex 502. The biased latch operator 110 is forced downward in the direction of arrow 810 to such an extent that the apex 502 is flush with the lower surface 610 of the cavity 602 of the female adapter 116, at which point the cavity of the female adapter 602 presents a clear channel for the withdrawal of the remainder of the male adapter 112.

From the foregoing description, it will be recognized by those skilled in the art that a connector for connecting two hoses has been provided. The connector is configured to accomplish a positive fluid connection between two devices at normal operating pressures. However, the connector is further configured to provide a quick disconnect between the components of the connector as a result of a sufficient axial force on the connector.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

I claim:

1. A connector for connecting two devices in fluid communication, said connector comprising:

a male adapter defining a groove defining a first surface outboard to a first device attached to said male adapter;

a female body having a cavity, a latch body and a biased latch operator, said latch body defining a latch receptor, said biased latch operator defining a handle and a tang, said tang being dimensioned to be slidably received within said latch receptor, said tang defining an opening adapted to receive said male adapter, said tang further defining a lower border of said opening, said lower border having dimensions selected for engaging said groove of said male adapter thereby interlocking said male adapter in said female adapter, said tang further defining a first side inboard to a second device attached to said female adapter, a second side outboard to the second device attached to said female adapter, and a first chamfer on said first side along said lower border of said opening, said first chamfer defined in configuration selected to facilitate removal of said male adapter from inside said female adapter, whereby when an axial force is applied in opposition to the connection between said male adapter and said female adapter, said first surface of said groove of said male adapter contacts said first chamfer of said tang of said female adapter, encouraging said tang downward in order to disengage said male adapter from said female adaptor, wherein said axial force is greater than an operating force caused by a pressure of a fluid within said cavity.

2. The connector of claim 1 wherein said tang further defines a second chamfer on said second side along said lower border, said second chamfer defined in a configuration selected to facilitate insertion of said male adapter in said female adapter.

3. The connector of claim 1 wherein said male adapter defines a selected configuration from said groove to a distal end thereof and said tang defines a selected configuration whereby when any portion of said selected configuration of said male adapter engages said tang, said tang is encouraged downward in order to accommodate removal of said male adapter from said female adapter.

4. An apparatus for releasably connecting two devices in fluid communication, said apparatus comprising:
   a body having a cavity, said cavity having a cavity opening, said cavity configured to receive a plug of a male adapter inserted through said cavity opening, said body having a slot that intersects said cavity; and
   a latch operator having a tang cooperating with said slot, said tang having a through-opening configured to receive said plug, said tang being biased to slide within said slot, said tang being held captive in said slot,
   said through-opening having an edge located such that said edge enters said cavity when said tang moves into a biased position, said edge configured to engage a groove in said plug of said male adapter,
   said edge having a first chamfer extending from a first side of said tang into said through-opening and toward a second side of said tang opposite said first side, said second side of said tang adjacent said cavity opening,
   said first chamfer configured to retain said plug within said cavity until a pulling force of a specified value is applied between said male adapter and said body, said first chamfer configured to cause said tang to move against a bias when said first chamfer is engaged by a corner of said groove in said plug when said plug is removed from said cavity, wherein said specified value of said pulling force is greater than an operating force caused by a pressure of a fluid within said cavity.

5. The apparatus of claim 4 wherein said latch operator includes a handle extending from said tang, said handle extending along a portion of said body, said handle biased away from said body.

6. The apparatus of claim 5 further including a spring positioned between said handle and said body, said spring biasing said handle away from said body.

7. The apparatus of claim 4 wherein said tang is held captive in said slot by at least one protuberance, said at least one protuberance being a stop to hold said tang captive in said slot against a bias force.

8. The apparatus of claim 4 wherein said edge further includes a second chamfer extending from said second side of said tang into said through-opening, said second chamfer joining said first chamfer at an apex between said first and second sides of said tang.

9. The apparatus of claim 8 wherein said second chamfer is configured to cause said tang to move against a bias when said second chamfer is engaged by said plug when said plug is inserted in said cavity.

10. An apparatus for releasably connecting two devices in fluid communication, said apparatus comprising:
    a body having a cavity, said cavity having a cavity opening and a posterior end opposite said cavity opening, said cavity configured to receive a plug of a male adapter inserted through said cavity opening, said body having a slot that intersects said cavity; and
    a latch operator having a tang slideably engaging said slot, said tang having an opening, said tang being held captive in said slot, said tang having a first position relative to said body wherein said opening is positioned to allow said cavity to receive said plug through said opening, said tang having a second position relative to said body wherein said tang is biased such that an edge of said opening protrudes into said cavity,
    said edge having a first edge surface at an angle to a first tang surface of said tang, said first tang surface being proximate to said posterior end of said cavity,
    wherein said edge is configured to engage a groove in said plug of said male adapter and said edge is configured to retain said plug in said cavity until a specified axial force is applied that causes a groove edge to engage said first edge surface to force said tang into said first position and allowing said plug to exit said cavity said specified axial force is greater than an operating force caused by a pressure of a fluid within said cavity.

11. The apparatus of claim 10 wherein said latch operator includes a handle extending from said tang, said handle extending along a portion of said body, said handle biased away from said body.

12. The apparatus of claim 11 further including a spring positioned between said handle and said body, said spring biasing said handle away from said body.

13. The apparatus of claim 10 wherein said tang is held captive in said slot by at least one protuberance, said at least one protuberance being a stop to hold said tang captive in said slot against a bias force.

14. The apparatus of claim 10 wherein said edge further includes a second edge surface extending from a second tang surface into said through-opening, said second edge surface joining said first edge surface at an apex between said first and second tang surfaces.

15. The apparatus of claim 10 wherein said second edge surface is configured to cause said tang to move against a bias when said second edge surface is engaged by said plug when said plug is inserted in said cavity.

16. An apparatus for releasably connecting a male adapter having a plug with a circumferential groove, said apparatus comprising:
    a body configured to be attached to a conduit;
    a cavity in said body, said cavity having an opening dimensioned to receive the plug of the male adapter into said cavity, said cavity having a slot in register with the circumferential groove when said cavity has received the plug; and
    a member movably retained in said slot, said member having a first surface proximate said opening, said member having a second surface distal to said opening, said member being biased to a first position in which selected portions of said first and second surfaces protrude into said cavity, said member configured to engage the circumferential groove of the plug when said member is in said first position and the plug is received in said cavity,
    said first surface being a first chamfer having an angle sufficient to force said member into a second position after the plug engages said first surface, said second position of said member allowing the plug to move within said cavity,
    said second surface being a second chamfer, said second surface adjacent a third surface substantially perpendicular to a longitudinal axis of said cavity, said second surface having an angle relative to said third surface such that when a specified pulling force is applied to the male adapter, a corner of the circumferential groove of the plug contacts said second surface and thereby causes said member to move into said second position, thereby allowing the plug to be removed from said cavity said specified pulling force is greater than an operating force caused by a pressure of a fluid within said cavity.

17. The apparatus of claim 16 wherein a portion of said third surface protrudes into said cavity when said member is in said first position.

18. The apparatus of claim 16 wherein said member is biased by a spring forcing said member toward said first position.

19. The apparatus of claim 16 wherein said member is connected to a handle proximate an outside surface of said body, said handle configured to allow said member to be moved to said second position.

20. The apparatus of claim 16 further including a rounded interface where said second surface joins said third surface.

* * * * *